US012789565B2

(12) United States Patent
Ito

(10) Patent No.: US 12,789,565 B2
(45) Date of Patent: Nov. 10, 2026

(54) SUSPENSION MEMBER ASSEMBLY

(71) Applicant: TOYOTA JIDOSHA KABUSHIKI KAISHA, Toyota (JP)

(72) Inventor: Takahiro Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 19/343,094

(22) Filed: Sep. 29, 2025

(65) Prior Publication Data

US 2026/0131610 A1 May 14, 2026

(30) Foreign Application Priority Data

Nov. 14, 2024 (JP) ................................. 2024-198723

(51) Int. Cl.

*B60G 9/00* (2006.01)
*B62D 21/09* (2006.01)
*B62D 21/11* (2006.01)
*B62D 21/15* (2006.01)
*B62D 25/08* (2006.01)
*B62D 25/20* (2006.01)

(52) U.S. Cl.

CPC .......... *B60G 9/003* (2013.01); *B60G 2200/20* (2013.01); *B60G 2206/606* (2013.01)

(58) Field of Classification Search

CPC ................ B60G 9/003; B60G 2200/20; B60G 2206/606; B62D 21/09; B62D 21/11; B62D 21/152; B62D 25/08; B62D 25/087; B62D 25/2027

USPC .................................................. 280/124.109

See application file for complete search history.

(56) References Cited

U.S. PATENT DOCUMENTS

| | | | | |
|---|---|---|---|---|
| 3,441,289 | A * | 4/1969 | Ryszewski | B60G 99/00 280/124.109 |
| 12,134,426 | B1 * | 11/2024 | Pinsonneault | B60K 1/04 |
| 2007/0215402 | A1 * | 9/2007 | Sasaki | B62D 29/008 180/232 |
| 2007/0246971 | A1 * | 10/2007 | Hanakawa | B62D 25/081 296/203.01 |
| 2009/0020972 | A1 * | 1/2009 | Tatsumi | B62D 25/088 280/124.1 |
| 2013/0221708 | A1 * | 8/2013 | Hanakawa | B62D 25/088 296/193.09 |

(Continued)

FOREIGN PATENT DOCUMENTS

| | | | | |
|---|---|---|---|---|
| CN | 104443032 A | * | 3/2015 | B62D 25/082 |
| CN | 208309359 U | * | 1/2019 | |

(Continued)

*Primary Examiner* — Daniel M. Keck

(74) *Attorney, Agent, or Firm* — Sughrue Mion, PLLC

(57) ABSTRACT

A suspension member assembly is provided which has a suspension member and a tower bar. The suspension member includes left and right side beams, a front cross member, and first and second rear cross members. The front cross member has a length in a vehicle front-and-rear direction shorter than a length in a vehicle up-and-down direction. The tower bar is provided at a vehicle rear side relative to the front cross member, and at an upper side relative to the first and second rear cross members, connects between the left and right side beams in a width direction, and has at least two fastening points with each of the left and right side beams.

20 Claims, 9 Drawing Sheets

(56) References Cited

U.S. PATENT DOCUMENTS

| | | | | |
|---|---|---|---|---|
| 2014/0367994 | A1* | 12/2014 | Sasaki | B62D 25/088 296/192 |
| 2018/0370576 | A1* | 12/2018 | Shibata | B62D 25/088 |
| 2020/0062309 | A1* | 2/2020 | Watanabe | B62D 25/081 |
| 2020/0062314 | A1* | 2/2020 | Matsuoka | B62D 21/11 |
| 2020/0283068 | A1* | 9/2020 | Murai | B60K 1/00 |
| 2020/0317274 | A1* | 10/2020 | Yoshida | B62D 25/088 |
| 2021/0114662 | A1* | 4/2021 | Tashiro | B62D 21/152 |
| 2021/0114666 | A1* | 4/2021 | Tashiro | B62D 25/08 |
| 2021/0309301 | A1* | 10/2021 | Kuroda | B62D 25/081 |
| 2021/0309302 | A1* | 10/2021 | Hirai | B62D 25/088 |
| 2021/0309303 | A1* | 10/2021 | Hirai | B62D 25/081 |
| 2022/0274652 | A1* | 9/2022 | Nishida | B62D 25/081 |
| 2022/0274653 | A1* | 9/2022 | Nishida | B62D 29/04 |
| 2025/0162651 | A1* | 5/2025 | Yoshimoto | B62D 25/082 |
| 2025/0296638 | A1* | 9/2025 | Furuta | B62D 25/084 |
| 2025/0304184 | A1* | 10/2025 | Saeki | B62D 25/088 |
| 2026/0035041 | A1* | 2/2026 | Hirakawa | B60K 11/02 |

FOREIGN PATENT DOCUMENTS

| | | | | | |
|---|---|---|---|---|---|
| CN | 216783624 | U | | 6/2022 | |
| CN | 116161119 | A | | 5/2023 | |
| CN | 116812007 | A | | 9/2023 | |
| CN | 118405204 | A | * | 7/2024 | B62D 25/14 |
| DE | 102021130066 | B4 | * | 10/2025 | B62D 21/11 |
| EP | 3613653 | A1 | * | 2/2020 | B62D 25/085 |
| EP | 4 494 977 | A1 | | 1/2025 | |
| JP | H08127362 | A | * | 5/1996 | |
| JP | H09240510 | A | * | 9/1997 | B62D 25/2027 |
| JP | 2006281806 | A | * | 10/2006 | |
| JP | 2008126834 | A | * | 6/2008 | |
| JP | 2010000852 | A | * | 1/2010 | B60L 50/62 |
| JP | 2011131735 | A | * | 7/2011 | |
| JP | 2019077323 | A | * | 5/2019 | B62D 25/08 |
| JP | 2019177830 | A | * | 10/2019 | |
| JP | 2023-153497 | A | | 10/2023 | |
| JP | 2025177936 | A | * | 12/2025 | B60R 11/00 |
| KR | 0137695 | Y1 | * | 3/1999 | |
| KR | 20240171850 | A | * | 12/2024 | B60R 19/023 |
| RU | 235392 | U1 | * | 7/2025 | |

* cited by examiner

CROSS SECTION ALONG A-A LINE

CROSS SECTION ALONG D-D LINE

SUSPENSION MEMBER ASSEMBLY

CROSS REFERENCE TO RELATED APPLICATION

This application claims priority to Japanese Patent Application No. 2024-198723 filed on Nov. 14, 2024, which is incorporated herein by reference in its entirety including the specification, claims, drawings, and abstract.

TECHNICAL FIELD

The present disclosure relates to a structure of a suspension member assembly which is attached to a rear part of a vehicle body.

BACKGROUND

JP 2023-153497 A discloses a hollow suspension member which is connected in a quadrangular frame shape, manufactured through casting using a core. When the suspension member is formed in a hollow shape, there may be cases of insufficient rigidity of a portion to which a large load is applied from a suspension arm or the like connected to a wheel carrier. As such, in the suspension member of JP 2023-153497 A, a reinforcement member is set in the suspension member.

Battery electric vehicles (BEVs) are used, in which a driving apparatus of a rear wheel is mounted within the suspension member. In such battery electric vehicles, increasing a storage capacity of the battery is desired. However, in order to mount the driving apparatus on the vehicle, rigidity of the suspension member as a whole must be secured, and, in order to do so, a configuration may be employed in which a closed cross-sectional structure is employed for a cross member at a front side. However, when the closed cross-sectional structure is employed for the front-side cross member, there has been a problem in that a mounting space of the battery becomes smaller by a length corresponding to the length of the front cross member in a vehicle front-and-rear direction.

An advantage of the present disclosure lies in securing a battery mounting space while also securing the rigidity of the suspension member assembly.

SUMMARY

According to one aspect of the present disclosure, there is provided a suspension member assembly attached to a rear part of a vehicle body, the suspension member assembly comprising: a suspension member; and a tower bar attached to the suspension member, wherein the suspension member is integrally molded by casting, and comprises: left and right side beams disposed on respective sides of a rear part of a vehicle and which extend in a vehicle front-and-rear direction; a front cross member which connects between vehicle-front-side parts of the left and right side beams in a vehicle width direction; and a rear cross member which connects between vehicle-rear-side parts of the left and right side beams in the vehicle width direction, the front cross member has a length in the vehicle front-and-rear direction shorter than a length in a vehicle up-and-down direction, and the tower bar is provided at a vehicle rear side relative to the front cross member and at an upper side relative to the rear cross member, connects between the left and right side beams in the vehicle width direction, and has at least two fastening points with each of the left and right side beams.

By surrounding, with the tower bar and the front cross member, a front part of the suspension member and an upper side of a front-side portion of the suspension member with surfaces, the rigidity of the front-side portion of the suspension member can be increased. With this configuration, the front cross member can be formed not from the closed cross section, but from a T shape having the length in the vehicle front-and-rear direction shorter than the length in the vehicle up-and-down direction, so that the length of the front cross member in the vehicle front-and-rear direction can be shortened. Thus, a battery mounting space can be secured at the front side of the front cross member.

In the suspension member assembly of an aspect of the present disclosure, each of the left and right side beams may have, at a center in the vehicle front-and-rear direction, an upper arm connection part to which a suspension upper arm is attached, and the tower bar may be provided at a vehicle front side relative to the upper arm connection part.

With this configuration, rigidity of the suspension member at a front side relative to the upper arm connection part can be secured.

In the suspension member assembly of an aspect of the present disclosure, a center part of the front cross member in the vehicle width direction may have a length in the vehicle front-and-rear direction shorter than a length in the vehicle up-and-down direction.

With this configuration, a battery mounting space can be secured at the center part in the vehicle width direction.

In the suspension member assembly of an aspect of the present disclosure, the rear cross member may comprise: a first rear cross member; and a second rear cross member positioned at a vehicle front side relative to the first rear cross member.

With this configuration, the rigidity of the suspension member assembly as a whole can be increased, and a deformation mode in which the entirety of the suspension member assembly deflects can be suppressed.

In the suspension member assembly of an aspect of the present disclosure, the second rear cross member may have a lower arm attachment part to which a suspension lower arm is attached.

With this configuration, a load from a coil spring which is applied via the suspension lower arm can be received by the second rear cross member.

In the suspension member assembly of an aspect of the present disclosure, the lower arm attachment part may be a through hole formed on the second rear cross member, penetrating through in the vehicle front-and-rear direction.

With this configuration, the load from the coil spring which is applied via the suspension lower arm can be reliably transmitted to the second rear cross member.

In the suspension member assembly of an aspect of the present disclosure, each of the left and right side beams may include an upper portion and a lower portion, and the lower portion may be curved in a shape which is convex downward, so that a space is formed between the lower portion and the upper portion.

With this configuration, a height of the side beam as a whole in the up-and-down direction is increased, resulting in an improvement in longitudinal bending rigidity of the side beam, and an increase of the rigidity of the suspension member assembly as a whole.

In the suspension member assembly of an aspect of the present disclosure, the upper portion may be formed in a groove shape which is open at an outer side in the vehicle width direction.

With this configuration, bending rigidity in the longitudinal direction of the upper portion can be increased.

In the suspension member assembly of an aspect of the present disclosure, the lower portion may be formed in a groove shape which is open at a vehicle lower side.

With this configuration, lateral bending rigidity of the lower portion in the vehicle width direction can be increased.

In the suspension member assembly of an aspect of the present disclosure, the second rear cross member may extend from respective lower surfaces of the left and right side beams, and may have a U shape which is convex downward.

With this configuration, torsional rigidity of the suspension member assembly can be improved.

According to an aspect of the present disclosure, the battery mounting space can be secured while also securing the rigidity of the suspension member assembly.

BRIEF DESCRIPTION OF DRAWINGS

Embodiment(s) of the present disclosure will be described based on the following figures, wherein.

DESCRIPTION OF EMBODIMENTS

A suspension member assembly 70 according to an embodiment of the present disclosure will now be described. First, a vehicle 100 to which the suspension member assembly 70 is attached will be described. Directions “FR”, “UP”, and “RH” shown on various drawings respectively refer to a front side, an upper side, and a right side of the vehicle 100 to which the suspension member assembly 70 is attached. Further, opposite directions of FR, UP, and RH respectively refer to a rear side, a lower side, and a left side. In the following, when directions of front-and-rear, left-and-right, and up-and-down are used for explanation, unless otherwise noted, the directions refer to the front-and-rear direction, the left-and-right direction, and up-and-down direction of the vehicle 100. Further, the front-and-rear direction, the left-and-right direction, and the up-and-down direction of the vehicle 100 are coincident with a front-and-rear direction, a left-and-right direction, and an up-and-down direction of the suspension member assembly 70, respectively.

Figure 1:
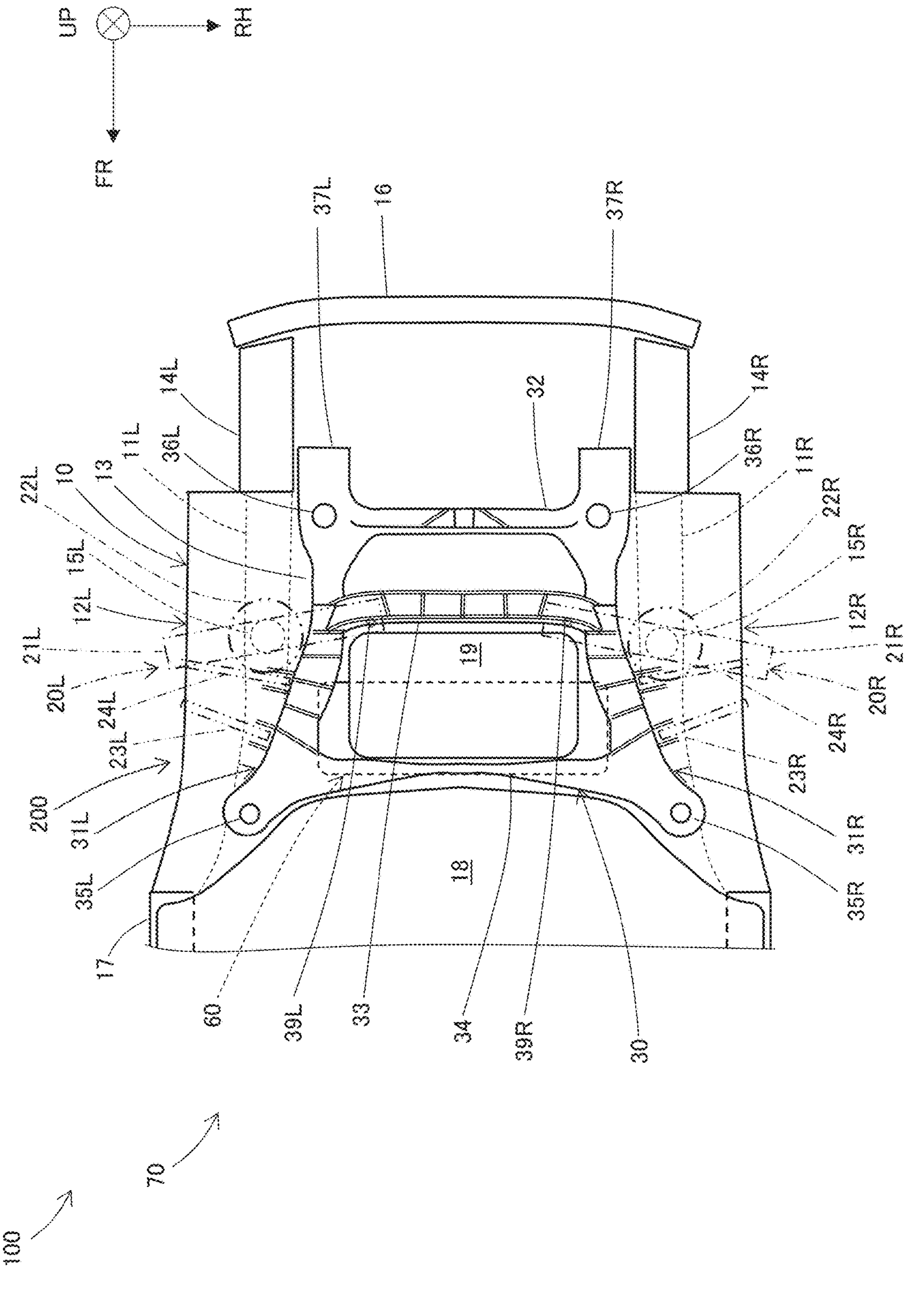
FIG. 1 is a bottom view of a vehicle rear part to which a suspension member assembly according to an embodiment of the present disclosure is attached.

As shown in FIG. 1, the vehicle 100 includes a vehicle body 200, and the suspension member assembly 70 attached to a rear part of the vehicle body 200. The suspension member assembly 70 includes a suspension member 30, and a tower bar 60.

As shown in FIG. 1, the vehicle body 200 includes a rear unit 10, a center unit 17, and a front unit (not shown). The rear unit 10 forms the rear part of the vehicle body 200. The center unit 17 forms a center part of the vehicle body 200. The front unit (not shown) forms a front part of the vehicle body 200. Each of the rear unit 10, the center unit 17, and the front unit is a die-cast product manufactured through integral casting. On the front unit, a driving apparatus 19 of the vehicle 100 is mounted.

The rear unit 10 includes left and right rear side member parts 11L and 11R, left and right rear wheel house parts 12L and 12R, and a rear floor part 13.

The left and right side member parts 11L and 11R are skeletal members which are disposed respectively on left and right sides of the rear unit 10, and which extend in the vehicle front-and-rear direction. The rear side member parts 11L and 11R are formed in, for example, a groove shape which is open at an outer side in the vehicle width direction, and may have a structure in which a plurality of reinforcement ribs are disposed. In the left and right rear side member parts 11L 11R, coil spring seats 15L and 15R are disposed, which respectively hold upper ends of coil springs 22L and 22R. At rear ends of the left and right rear side member parts 11L and 11R, left and right crash boxes 14L and 14R are respectively attached. At rear ends of the left and right crash boxes 14L and 14R, a rear bumper reinforcement 16 is attached. The rear bumper reinforcement 16 is a skeletal member which connects the rear ends of the left and right crash boxes 14L and 14R in the vehicle width direction.

The left and right rear wheel house parts 12L and 12R are plate-shaped portions on a circular arc of a semicircular cross section connected respectively to outer sides of the left and right rear side member parts 11L and 11R in the vehicle width direction. The left and right rear wheel house parts 12L and 12R house rear wheels at insides thereof.

The rear floor part 13 is a plate member connecting between the left and right rear side member parts 11L and 11R.

The center unit 17 is connected in a vehicle front side of the rear unit 10 with a bolt, through welding, or the like. Above the center unit 17, a cabin (not shown) is mounted. A battery pack 18 is mounted on the center unit 17. As shown in FIG. 1, a center of the battery pack 18 in the vehicle width direction projects rearward toward the suspension member 30. In the projecting portion, an assisting device of the battery pack 18 such as a joint box, an ECU, or the like, may be housed.

The suspension member 30 is integrally molded through casting, and is attached below the rear unit 10 of the vehicle body 200. The suspension member 30 is a quadrangular frame-shaped member including left and right side beams 31L and 31R, a first rear cross member 32 at a rear side, a second rear cross member 33, and a front cross member 34 at a front side. Here, the first rear cross member 32 and the second rear cross member 33 form a rear cross member which connects the left and right side beams 31L and 31R in the vehicle width direction at a vehicle-rear-side part of the suspension member 30. The front cross member 34 connects the left and right side beams 31L and 31R in the vehicle width direction, at the vehicle front part of the suspension member 30.

The left and right side beams 31L and 31R are portions that are disposed respectively at left and right sides of the vehicle 100, and that extend in the vehicle front-and-rear direction. At front ends of the left and right side beams 31L and 31R, left and right front vehicle body attachment parts 35L and 35R are provided, which are attached respectively to lower sides of the left and right rear side member parts 11L and 11R by mounting members. In addition, at the rear side of the left and right side beams 31L and 31R, rear vehicle body attachment parts 36L and 36R are disposed, which are attached to a lower side of the rear unit 10 by mounting members. Further, left and right vehicle-rear-side ends 37L and 37R of the left and right side beams 31L and 31R, respectively, extend respectively from the rear vehicle body attachment parts 36L and 36R toward a vehicle rear side. The left and right vehicle-rear-side ends 37L and 37R are positioned at a vehicle rear side relative to vehicle front-side ends of the left and right crash boxes 14L and 14R.

Figure 2:
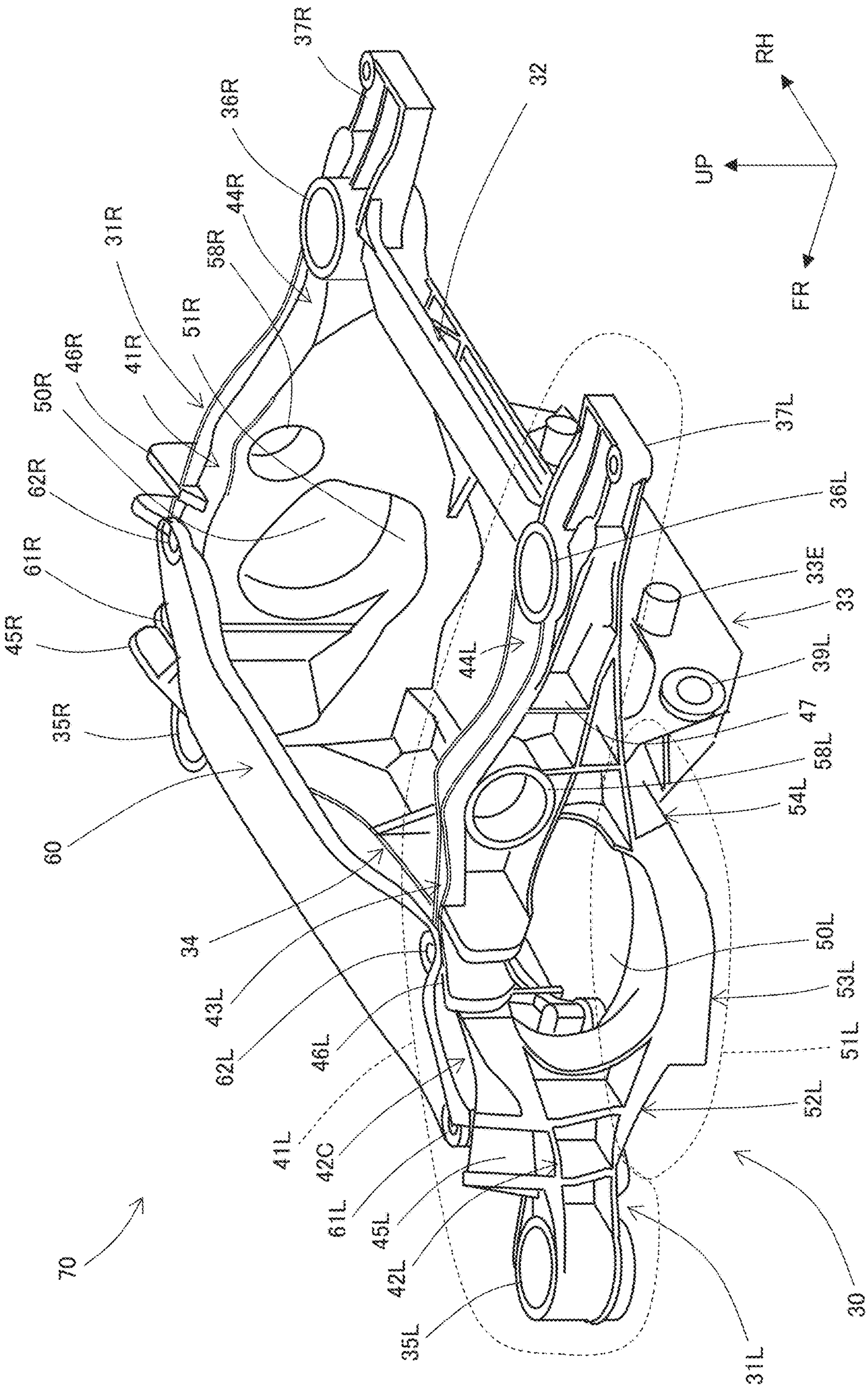
FIG. 2 is a perspective diagram showing the suspension member assembly according to the embodiment of the present disclosure, viewed diagonally from an upper rear side.
Figure 3:
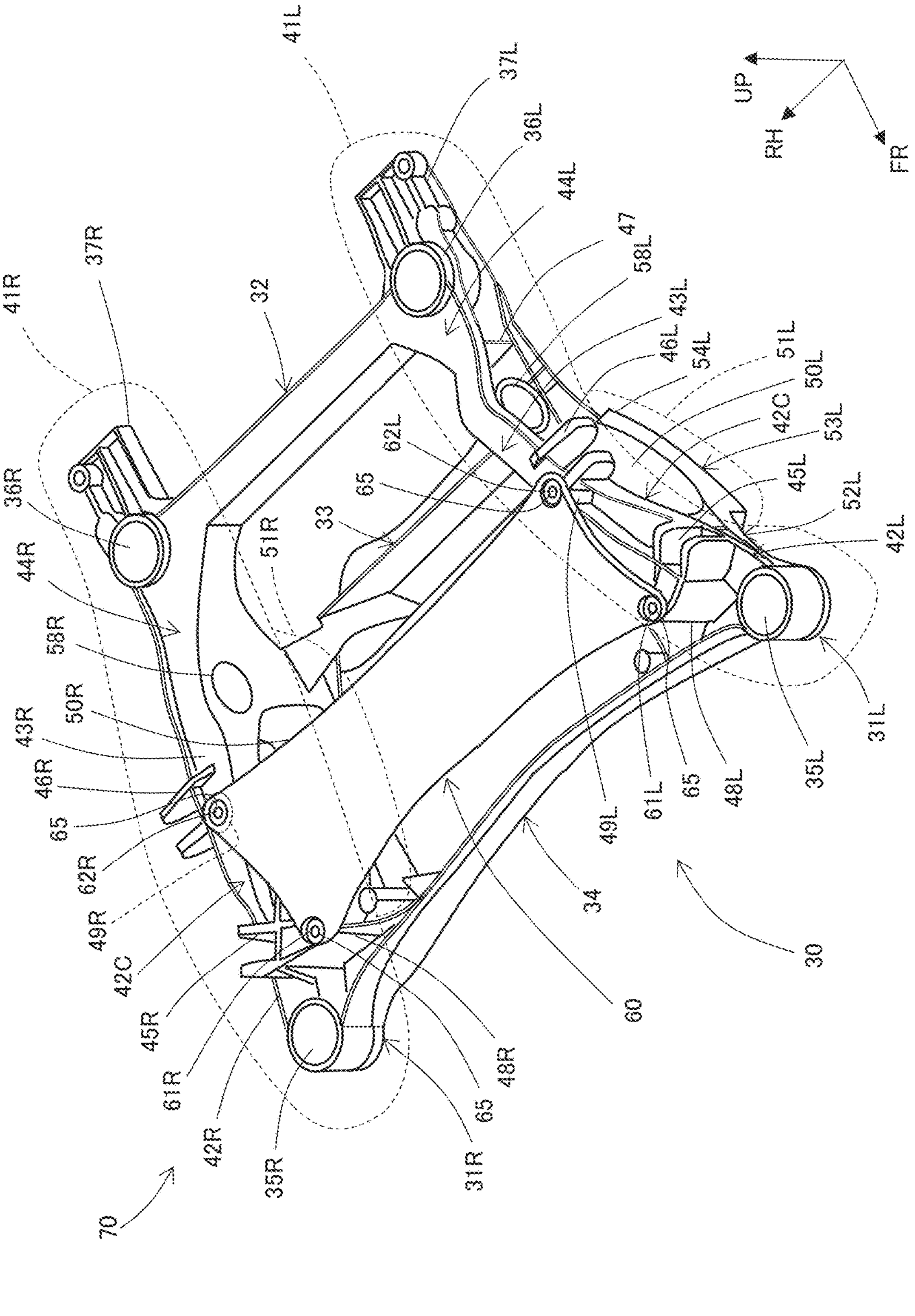
FIG. 3 is a perspective diagram showing the suspension member assembly according to the embodiment of the present disclosure, viewed diagonally from an upper front side.

As shown in FIGS. 2 and 3, at upper sides of the left and right side beams 31L and 31R, there are provided left and right first upper arm connection parts 45L and 45R to which left and right first suspension upper arms 23L and 23R (refer to FIG. 1) are respectively connected, and left and right second upper arm connection parts 46L and 46R to which left and right second suspension upper arms 24L and 24R are respectively connected. The left and right first upper arm connection parts 45L and 45R are disposed at an immediate rear side of the left and right front vehicle body attachment parts 35L and 35R. The second upper arm connection parts 46L and 46R are disposed respectively at centers of the left and right side beams 31L and 31R in the vehicle front-and-rear direction. The first upper arm connection parts 45L and 45R, and the second suspension upper arms 24L and 24R are respectively formed from two plate-shaped members. As shown in FIG. 3, at upper sides of the left and right side beams 31L and 31R, left and right front pedestals 48L and 48R, and left and right rear pedestals 49L and 49R, to which the tower bar 60 is attached, are respectively provided.

Figure 4:
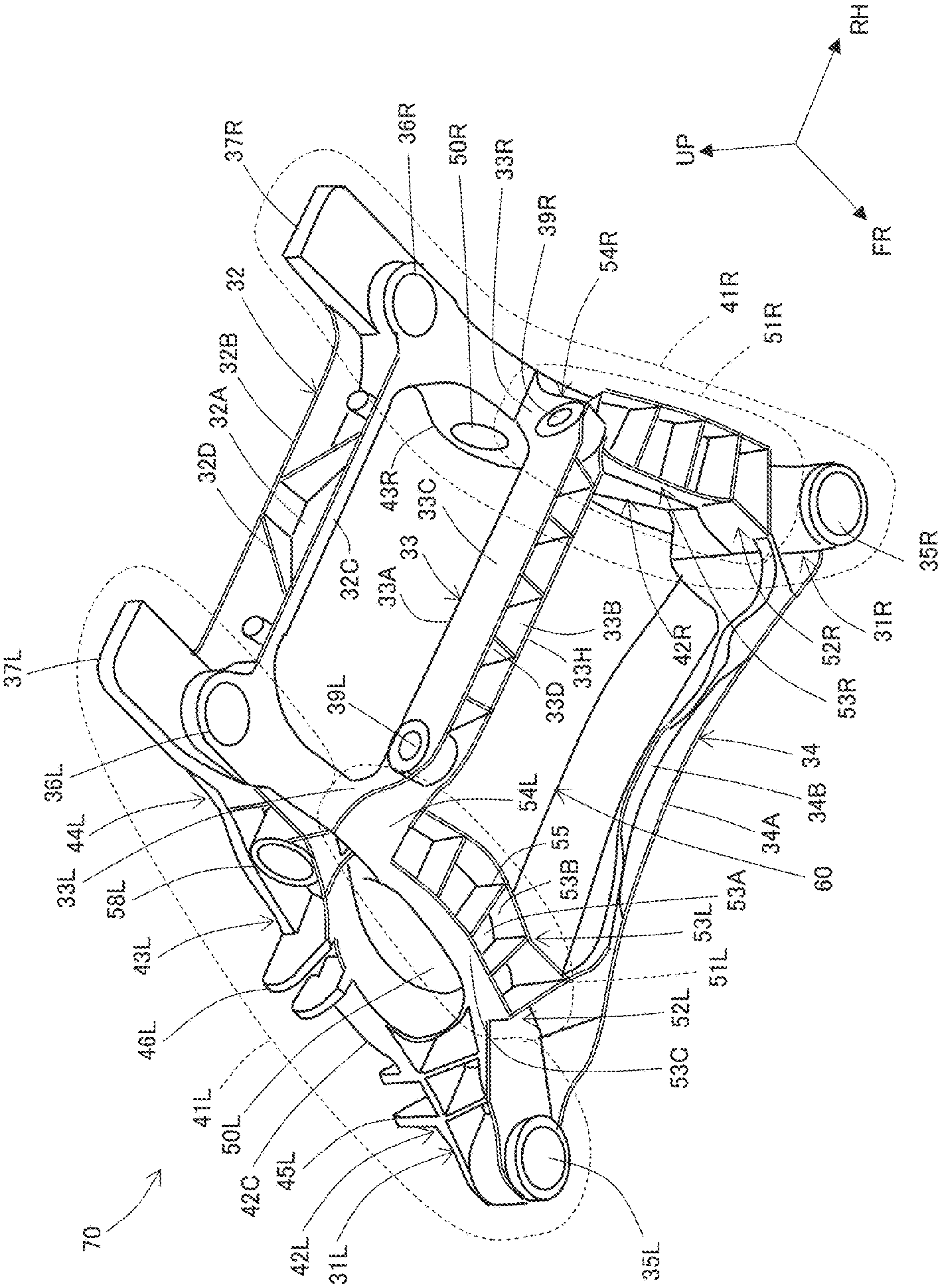
FIG. 4 is a perspective diagram showing the suspension member assembly according to the embodiment of the present disclosure, viewed diagonally from a lower rear side.

As shown in FIG. 3, the front cross member 34 is a portion which connects between the left and right front vehicle body attachment parts 35L and 35R in the vehicle width direction. As shown in FIG. 4, the first rear cross member 32 at the rear side is a portion which connects between the left and right rear vehicle body attachment parts 36L and 36R in the vehicle width direction. The second rear cross member 33 is a portion which connects the left and right side beams 31L and 31R in the vehicle width direction, at a vehicle front side relative to the first rear cross member 32. As will be described later, the second rear cross member 33 is a portion which extends from lower surfaces of the left and right side beams 31L and 31R, and which has a U shape which is convex downward. On left and right ends of the second rear cross member 33, left and right lower arm attachment parts 39L and 39R to which suspension lower arms 21L and 21R are respectively attached are respectively provided.

Figure 5:
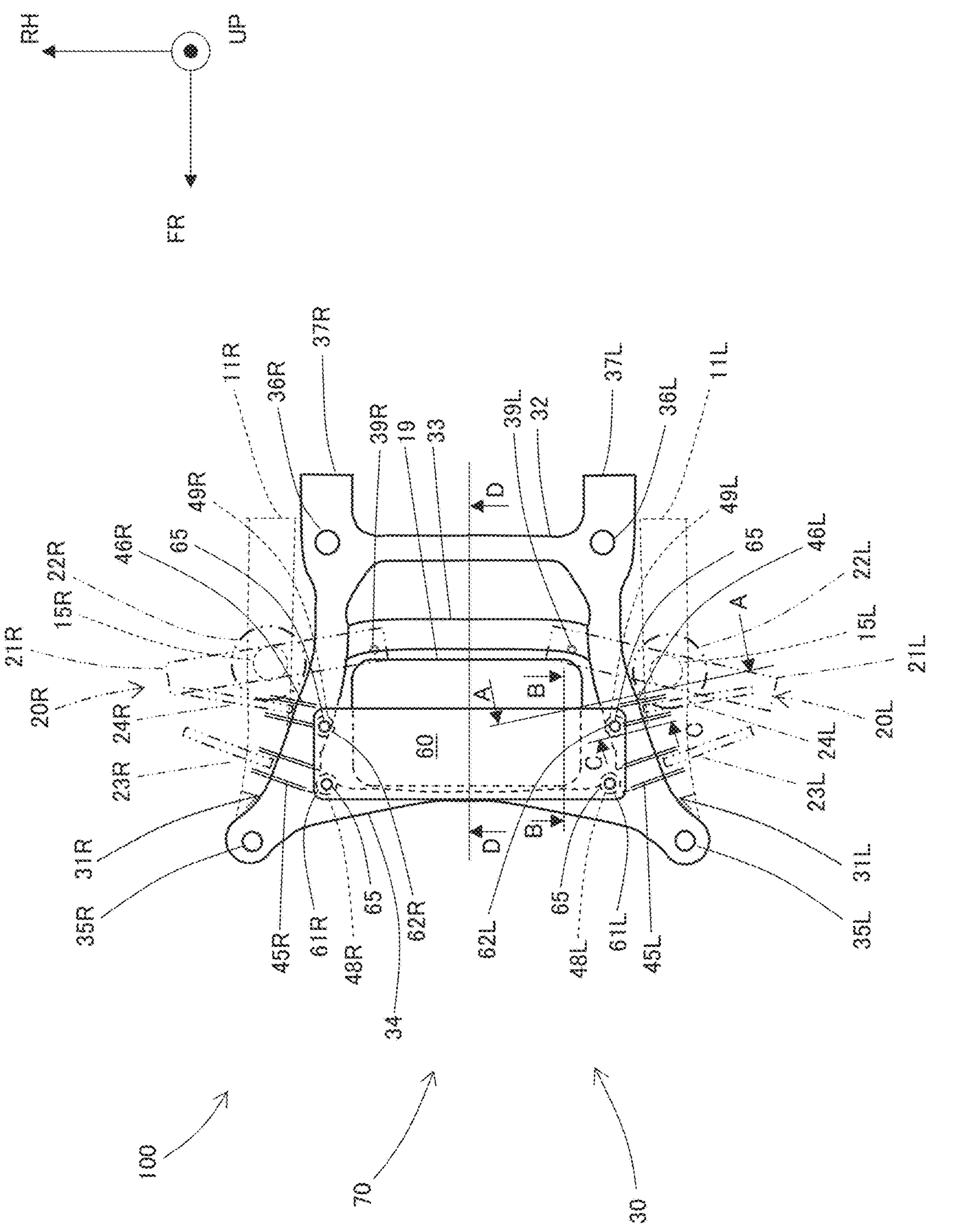
FIG. 5 is a plan view of the suspension member assembly according to the embodiment of the present disclosure.

As shown in FIGS. 1 and 5, to the suspension member 30, a plurality of arms of left and right suspending devices 20L and 20L which suspend left and right rear wheels are connected. The suspending devices 20L and 20R are formed respectively from a plurality of arms which connect knuckles of left and right rear wheels and the suspension member 30, the coil springs 22L and 22R, and left and right shock absorbers (not shown). Of these, ends, at the vehicle body side, of the left and right suspension lower arms 21L and 21R are connected respectively to the left and right lower arm attachment parts 39L and 39R of the second rear cross member 33. Further, at upper sides of the left and right suspension lower arms 21L and 21R, the left and right coil springs 22L and 22R are respectively attached. Upper ends of the left and right coil springs 22L and 22R are held respectively by the coil spring seats 15L and 15R of the left and right rear side member parts 11L and 11R. Moreover, as shown in FIG. 5, ends, at the vehicle body side, of the left and right first suspension upper arms 23L and 23R are connected respectively to the first upper arm connection parts 45L and 45R. Ends, at the vehicle body side, of the left and right second suspension upper arms 24L and 24R are connected respectively to the second upper arm connection parts 46L and 46R. Arms other than the left and right suspension lower arms 21L and 21R, the left and right first suspension upper arms 23L and 23R, and the left and right second suspension upper arms 24L and 24R are not illustrated, and will not be explained herein.

As shown in FIGS. 3 and 5, the tower bar 60 is a plate-shape member which connects between the left and right side beams 31L and 31R in the vehicle width direction. On an upper surface of the tower bar 60, a plurality of beads (not shown) are provided for reinforcement. The tower bar 60 is attached by bolts 65 over the left and right front pedestals 48L and 48R, and the left and right rear pedestals 49L and 49R, provided respectively at the upper sides of the left and right side beams 31L and 31R. Fastening points with the front pedestals 48L and 48R, and the left and right rear pedestals 49L and 49R respectively form left and right front fastening points 61L and 61R, and left and right rear fastening points 62L and 62R of the tower bar 60. As shown in FIGS. 3 and 5, the tower bar 60 is provided at a rear side relative to the front cross member 34 and at an upper side relative to the first rear cross member 32 and the second rear cross member 33.

Next, with reference to FIGS. 2 to 9, details of the structures of the suspension member 30 and the tower bar 60 will be described. First, the details of the structure of the suspension member 30 will be described.

As already described above with reference to FIG. 1, the suspension member 30 is a quadrangular frame-shaped member including the left and right side beams 31L and 31R, the first rear cross member 32 at the rear side, the second rear cross member 33, and the front cross member 34 at the front side.

As shown in FIGS. 2 to 5, the left side beam 31A includes an upper portion 41L and a lower portion 51L. The lower portion 51 is curved in a shape which is convex downward, so that a space is formed between the lower portion 51 and the upper portion 41.

The upper portion 41L includes a front part 42L, a connection part 42C, a center part 43L, a rear part 44L, and the vehicle-rear-side end 37L. The front part 42L is a portion which extends from the left front vehicle body attachment part 35L toward a slanted upper direction in the vehicle rear side, to a section at a rear side of the first upper arm connection part 45L. The connection part 42C is a portion which is connected to the front part 42L, and which extends from a section at the rear side of the first upper arm connection part 45L toward a slanted upper side in the vehicle rear side to a section in front of the second upper arm connection part 46L. The center part 43L is a portion which is connected to a rear end of the connection part 42C, which is curved in a shape which is convex upward, and which has a rear part extending horizontally toward the vehicle rear side. The rear part 44L is a portion which is connected to a rear end of the center part 43L, and which extends horizontally toward the vehicle rear side to the rear vehicle body attachment part 36L. As already described, the left vehicle-rear-side end 37L is a portion which extends horizontally from the left rear vehicle body attachment part 36L toward the vehicle rear side.

Figure 6:
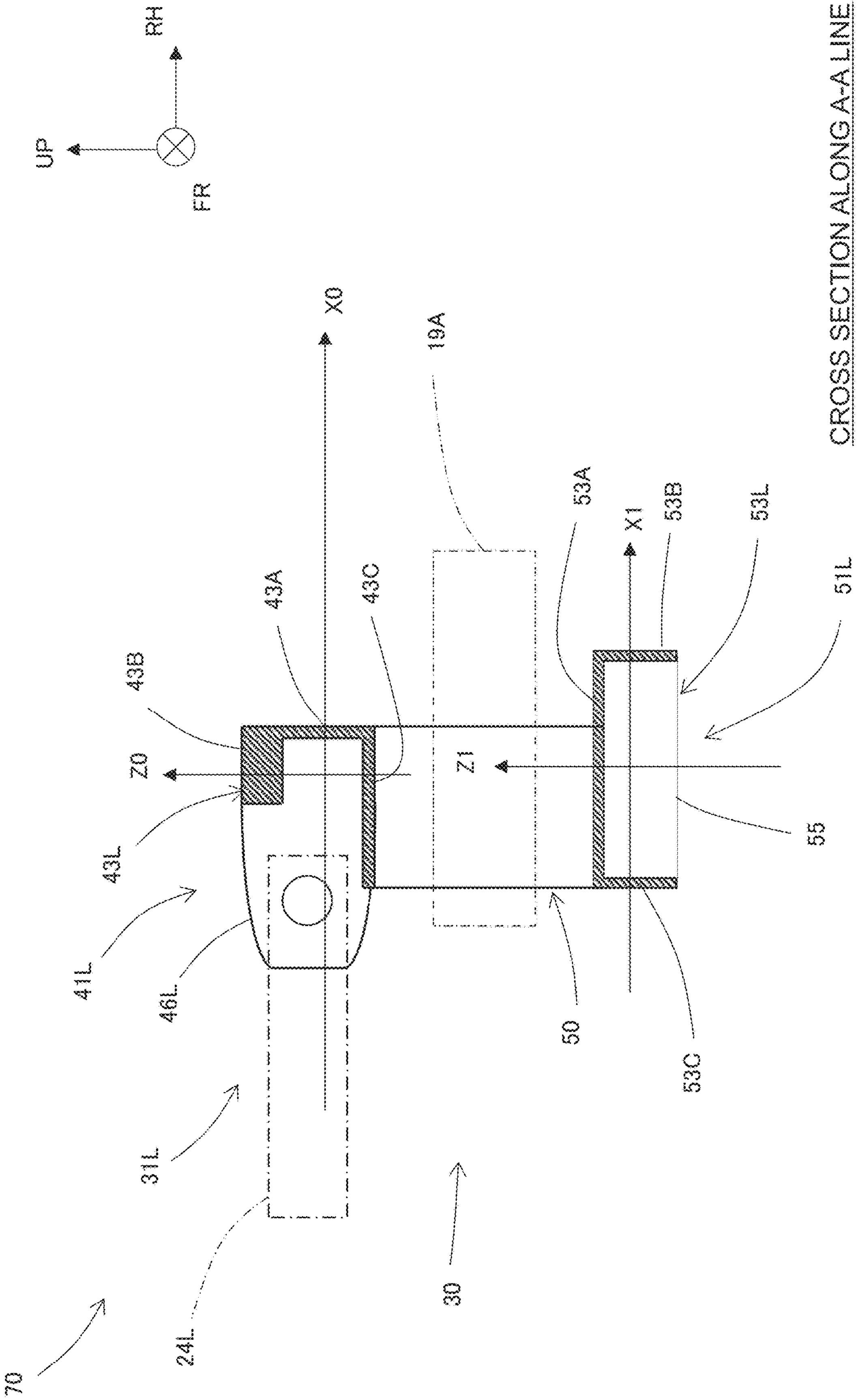
FIG. 6 is a schematic cross-sectional diagram of the suspension member assembly according to the embodiment of the present disclosure, showing a cross section along an A-A line of FIG. 5.
Figure 8:
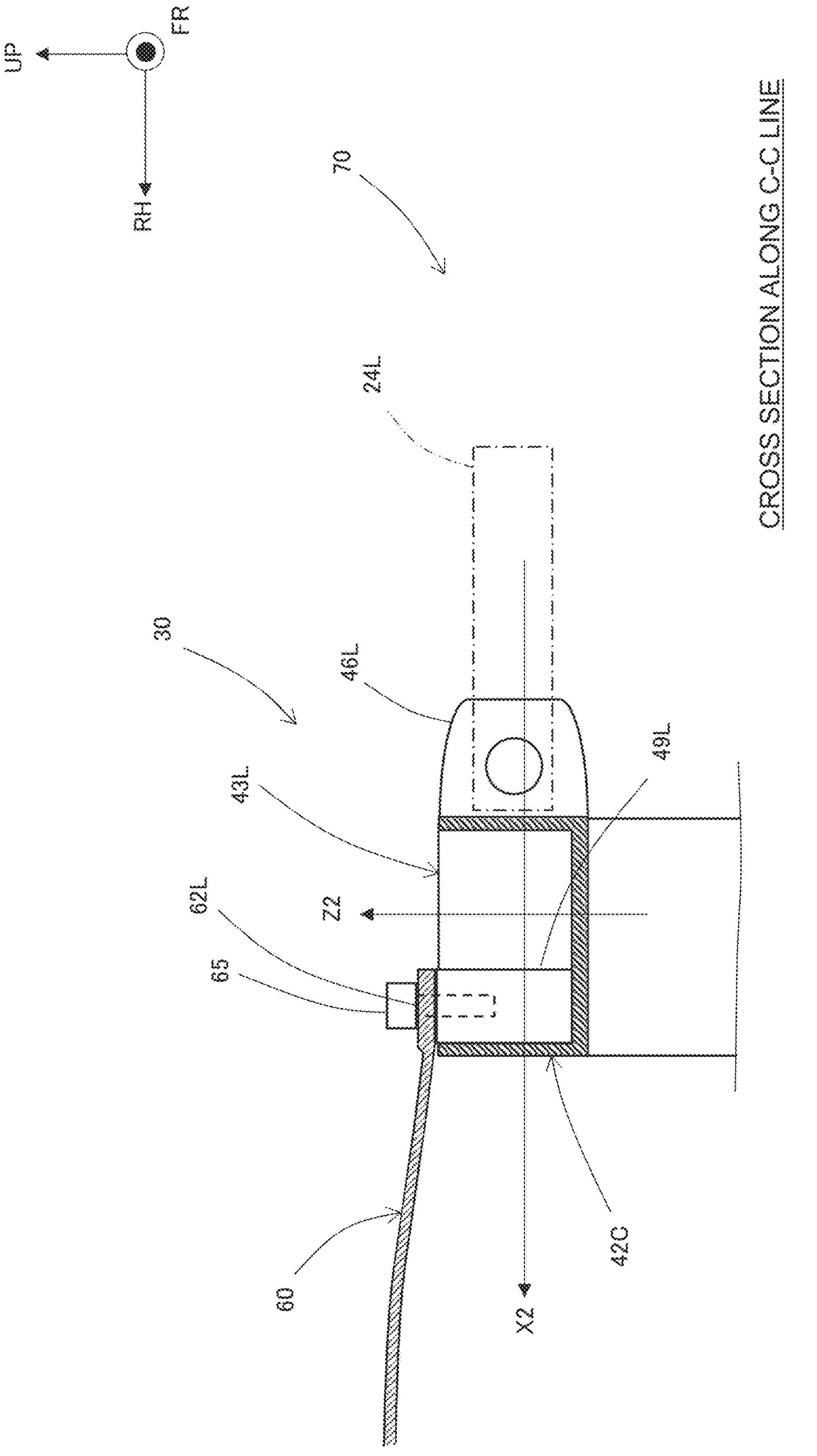
FIG. 8 is a schematic upright cross-sectional diagram of a rear pedestal of the suspension member assembly according to the embodiment of the present disclosure, showing a cross section along a C-C line of FIG. 5.

As shown in FIG. 6, the center part 43L is formed from a web 43A, an upper flange 43B, and a lower flange 43C, and has a groove shape which is open at an outer side in the vehicle width direction (vehicle-left direction). Similarly, each of the front part 42L and the rear part 44L has a groove shape which is open at an outer side in the vehicle width direction (vehicle-left direction). Because of this, the upper portions 41L and 41R have bending rigidity about an X0 axis larger than bending rigidity about a Z0 axis. Here, the X0 axis is a coordinate axis in the vehicle width direction, passing through a center of a cross section of the upper portion 41L, and the Z0 axis is a coordinate axis in the up-and-down direction, passing through the center of the cross section of the upper portion 41L. In addition, as shown in FIGS. 2 and 3, on each of the front part 42L and the rear part 44L, a plate-shaped rib plate 47 which extends in the vehicle width direction (vehicle-left direction) is provided. At the rear side of the center part 43L, a mount attachment part 58L to which the mount of the driving apparatus 19 is attached is provided. As shown in FIGS. 3 and 8, the connection part 42C has a groove shape which is open at a vehicle upper side, and, similar to the lower portion 51L to be described later, bending rigidity about a Z2 axis is larger than bending rigidity about an X2 axis. Here, as shown in FIG. 8 the Z2 axis is a coordinate axis in the up-and-down direction, passing through a center of a cross section of the connection part 42C, and the X2 axis is a coordinate axis in the vehicle width direction, passing through the center of the cross section of the center part 42C.

As shown in FIG. 4, the left lower portion 51L includes a front end part 52L, a rear end part 54L, and a curved part 53L. The front end part 52L is a portion connected to a lower side of the front part 42L of the upper portion 41L. The rear end part 54L is a portion connected to a lower side of the rear part 44L of the upper portion 41L. The curved part 53L is a portion which is curved in a shape which is convex downward, between the front end part 52L and the rear end part 54L. Between an upper surface of the curved part 53L and a lower surface of the center part 43L of the upper portion 41L, a circular cylindrical space 50L is formed. As shown in FIG. 6, the space 50L is a space through which a drive shaft 19A penetrates in the vehicle width direction As shown in FIGS. 4 and 6, the curved part 53L of the lower portion 51L is formed from a web 53A, an inner flange 53B, and an outer flange 53C, and has a groove shape which is open at the vehicle lower side. Because of this, the curved part 53L has bending rigidity about a Z1 axis larger than bending rigidity about an X1 axis. Here, the Z1 axis is a coordinate axis in the up-and-down direction, passing through a center of a cross section of the curved part 53L, and the X1 axis is a coordinate axis in the vehicle width direction, passing through the center of the cross section of the curved part 53L. Similarly, each of the front end part 52L and the rear end part 54L has a groove shape which is open at the vehicle lower side, and bending rigidity about the Z1 axis is higher than bending rigidity about the X1 axis. On each of the front end part 52L, the curved part 53L, and the rear end part 54L, a plurality of rib plates 55 having a plate shape and extending in the vehicle up-and-down direction are provided.

Figure 7:
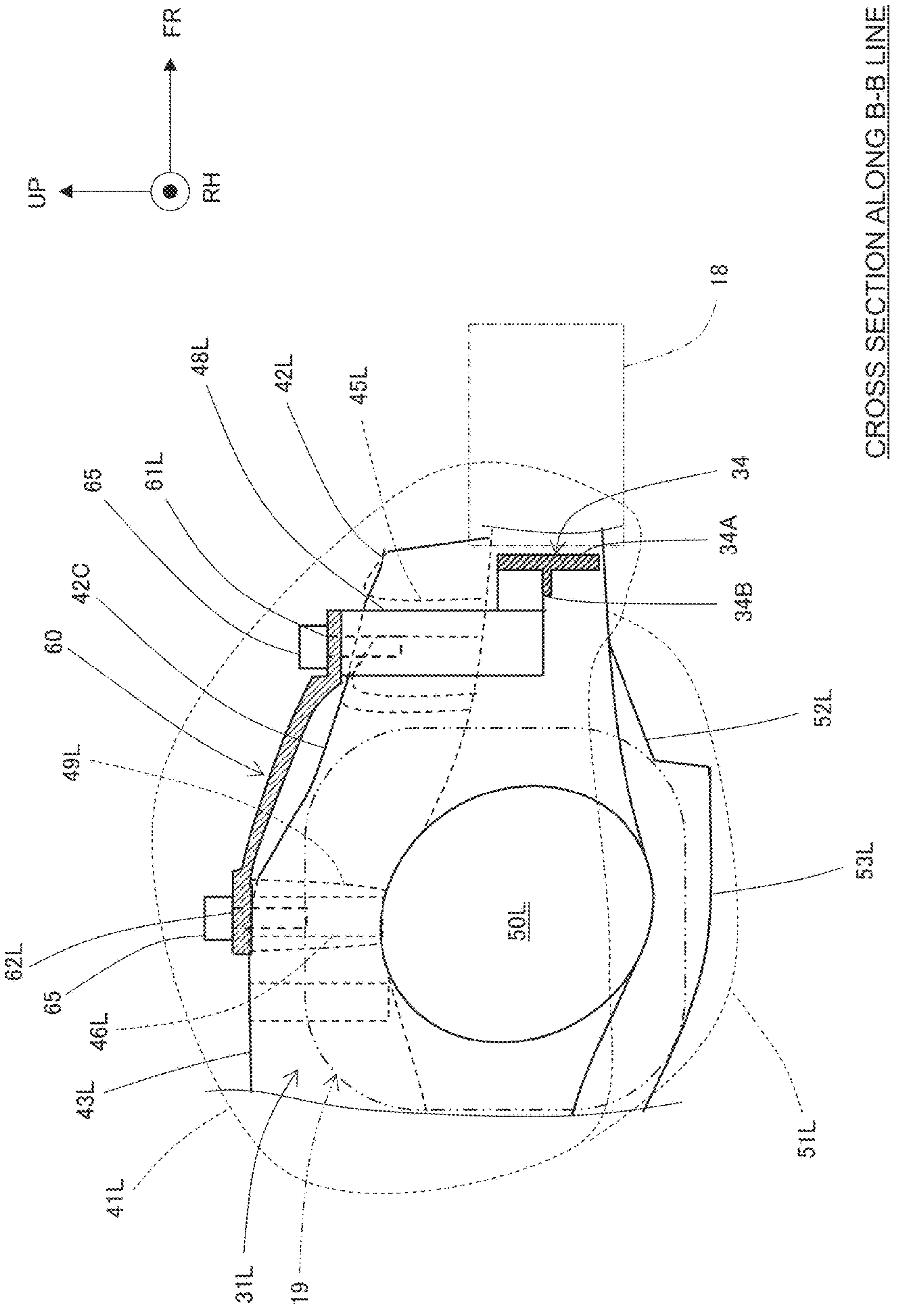
FIG. 7 is a schematic cross-sectional diagram of the suspension member assembly according to the embodiment of the present disclosure, showing a cross section along a B-B line of FIG. 5.

As shown in FIGS. 3, 5, and 7, the left front pedestal 48L is disposed immediately at the rear of the left front vehicle body attachment part 35L. The left front pedestal 48L is a portion between two plate-shaped members forming the first upper arm connection part 45L, and which protrudes from a surface, at an inner side in the vehicle width direction, of the front part 42L toward an inner side in the vehicle width direction. On the front pedestal 48L, a screw hole into which the bolt 65 is screwed is formed. The left rear pedestal 49L is provided at the center of the left side beam 31L in the vehicle front-and-rear direction, and on a front end part (the rear end part of the connection part 42C) of the center part 43L. As shown in FIGS. 7 and 8, the rear pedestal 49L is a circular cylindrical shaped portion disposed between an inner end, in the vehicle width direction, of a front plate-shaped member among the two plate-shaped members forming the second upper arm connection part 46L, and the inner flange of the connection part 42C. On the rear pedestal 49L also, a screw hole into which the bolt 65 is screwed is formed.

The right side beam 31L is symmetric in the left-and-right direction with the left side beam 31L, and includes the upper portion 41R and the lower portion 51R. The upper portion 41R includes a front part 42R, the connection part 42C, a center part 43R, a rear part 44R, and the vehicle-rear-side end 37R, and the first upper arm connection part 45R, the second upper arm connection part 46R, the front pedestal 48R, the rear pedestal 49R, and a mount attachment part 58R are provided. The lower portion 51R includes a front end part 52R, a rear end part 54R, and a curved part 53R.

As shown in FIGS. 3 and 7, the front cross member 34 has a T shape having a vertical plate 34A and a lateral plate 34B. The front cross member 34 has a center part in the vehicle width direction curved in a shape which is convex in the vehicle rear side. Further, the center part of the front cross member 34 in the vehicle width direction has a length in the vehicle front-and-rear direction shorter than a length in the vehicle up-and-down direction.

Figure 9:
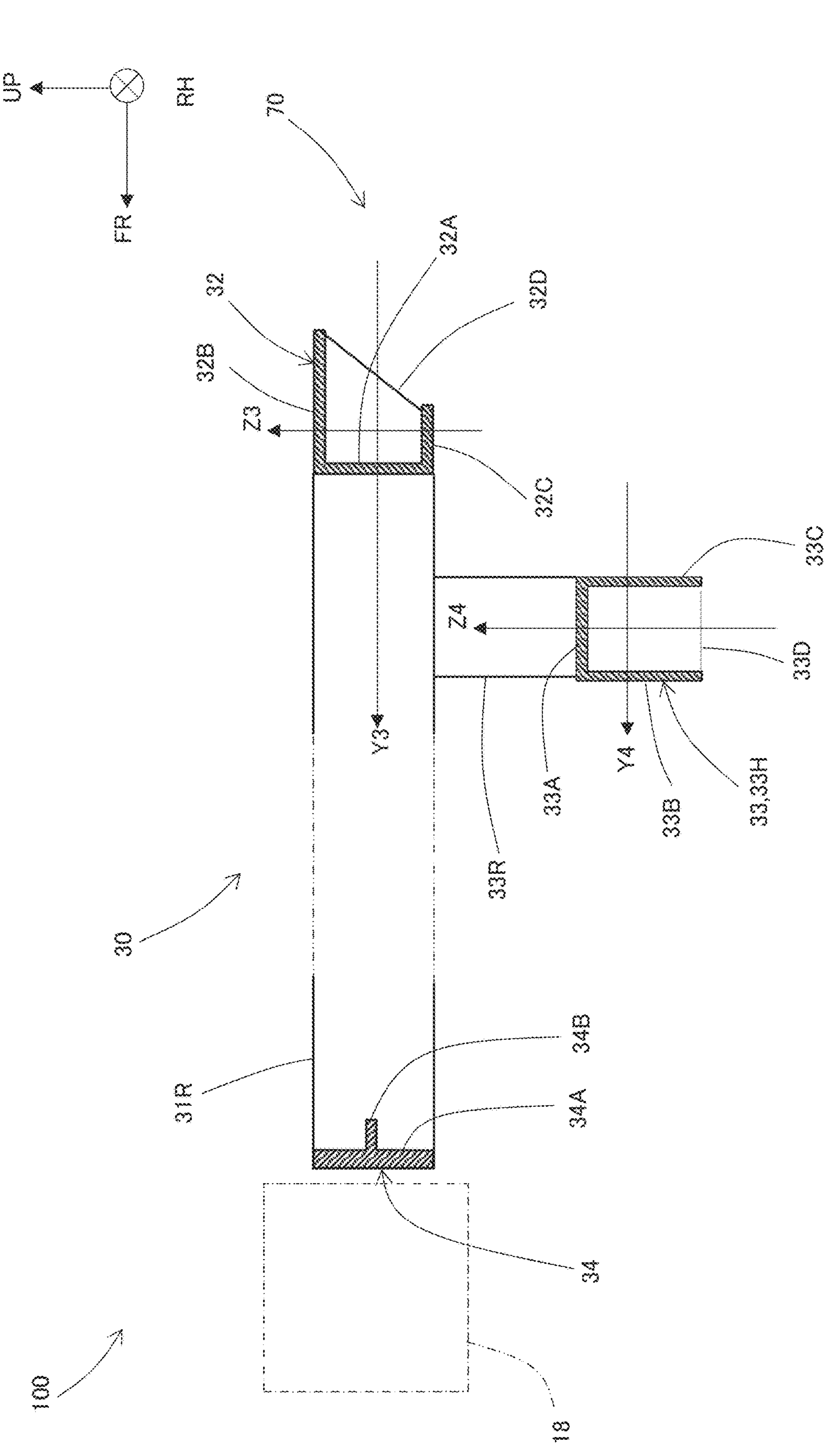
FIG. 9 is schematic cross-sectional diagram of the suspension member assembly according to the embodiment of the present disclosure, showing a cross section along a D-D line of FIG. 5.

As shown in FIGS. 3 and 9, the first rear cross member 32 is formed from a web 32A, an upper flange 32B, and a lower flange 32C, and has a groove shape which is open at the vehicle rear side. Because of this, the first rear cross member 32 has bending rigidity about a Y3 axis greater than bending rigidity about a Z3 axis. Here, the Y3 axis is a coordinate axis in the vehicle front-and-rear direction, passing through a center of a cross section of the first rear cross member 32, and the Z3 axis is a coordinate axis in the up-and-down direction, passing through the center of the cross section of the first rear cross member 32. In addition, on the first rear cross member 32, a rib plate 32D which extends from the web 32A toward the vehicle rear side is provided.

As shown in FIGS. 4 and 9, the second rear cross member 33 is a skeletal portion which extends downwardly from lower surfaces of the rear end parts 54L and 54R of the left and right lower portions 51L and 51R, and which connects the left and right side beams 31L and 31R in the vehicle width direction. The second rear cross member 33 is formed from a left end part 33L, a right end part 33R, and a horizontal part 33H. The left end part 33L and the right end part 33R are portions which extend downwardly from lower surfaces of the rear end parts 54L and 54R, respectively. The horizontal part 33H is a portion which connects the left end part 33L and the right end part 33R in the vehicle width direction. Each of the left end part 33L, the right end part 33R, and the horizontal part 33H has a U shape which is convex downward.

The horizontal part 33H is formed from a web 33A, a front flange 33*b*, and a rear flange 33C, and has a groove shape which is open at the vehicle lower side. In addition, on the horizontal part 33H, a rib plate 33D which extends from the web 33A toward the vehicle lower side is provided. Because of this, the second rear cross member 33 has bending rigidity about a Z4 axis larger than bending rigidity about a Y4 axis. Here, the Z4 axis is a coordinate axis in the up-and-down direction, passing through a center of a cross section of the second rear cross member 33, and the Y4 axis is a coordinate axis in the vehicle front-and-rear direction, passing through the center of the cross section of the second rear cross member 33. In addition, on left and right ends of the horizontal part 33H, the left and right lower arm attachment parts 39L and 39R are respectively provided. The left and right lower arm attachment parts 39L and 39R are through holes penetrating through in the vehicle front-and-rear direction. With this configuration, the loads from the left and right coil springs 22L and 22R can be reliably transmitted to the second rear cross member 33. In addition, with this configuration, the second rear cross member 33 can reliably receive the loads from the left and right coil springs 22L and 22R.

As described, in the suspension member assembly 70 of the embodiment of the present disclosure, by surrounding, with the front cross member 34 and the tower bar 60, the front part of the suspension member 30 and the upper part of the front-side portion of the suspension member 30, with surfaces, the rigidity of the front-side portion of the suspension member 30 can be increased. With this configuration, the front cross member 34 can be formed not by the closed cross section, but by the T shape having the length in the vehicle front-and-rear direction shorter than the length in the vehicle up-and-down direction, so that the length of the front cross member 34 in the vehicle front-and-rear direction can be shortened. With this configuration, a battery mounting space can be secured in front of the front cross member 34.

In addition, the front cross member 34 is curved so that the center part in the vehicle width direction is convex in the vehicle rear side. Because of this, with regard to the center of the battery pack 18 in the vehicle width direction, the center portion of the battery pack 18 in the vehicle width direction which projects rearward toward the suspension member 30 can be housed at the front side of the front cross member 34.

In the suspension member assembly 70 of the embodiment of the present disclosure, the front side of the tower bar 60 is fastened with bolts 65 to the left and right front pedestals 48L and 48R disposed immediately at the rear of the left and right front vehicle body attachment parts 35L and 35R. In addition, the rear side of the tower bar 60 is fastened with bolts 65 to the left and right rear pedestals 49L and 49R disposed at the centers of the left and right side beams 31L and 31R in the vehicle front-and-rear direction. Thus, the tower bar 60 has two fastening points on each of the left and right side beams 31L and 31R; namely, the front fastening points 61L and 61R, and the rear fastening points 62L and 62R. With this configuration, the tower bar 60 which is a plate shaped member and the left and right side beams 31L and 31R can be integrated, and the rigidity of the front-side portion of the suspension member 30 can thus be increased.

In addition, in the suspension member assembly 70 of the embodiment of the present disclosure, the tower bar 60 is provided at the vehicle front side relative to the second upper arm connection parts 46L and 46R provided at the center of the left and right side beams 31L and 31R in the vehicle front-and-rear direction. With this configuration, the tower bar 60 can increase the rigidity of the vehicle-front-side part of the suspension member 30 at the vehicle front side relative to the second upper arm connection parts 46L and 46R.

Further, the suspension member 30 of the suspension member assembly 70 of the embodiment of the present disclosure has left and right spaces 50L and 50R, and left and right side beams 31L and 31R having a high height in the up-and-down direction and having large longitudinal bending rigidity are connected to the first rear cross member 32 formed in a groove shape which is open at the vehicle rear side and having large longitudinal bending rigidity. Moreover, on the lower surfaces of the left and right side beams 31L and 31R, the second rear cross member 33 is connected having a U shape which is convex downward, which is open at the vehicle lower side, and which has large lateral bending rigidity in the vehicle front-and-rear direction. With this configuration, the rigidity of the vehicle-rear-side part of the suspension member 30 can be increased.

As described, in the suspension member assembly 70, by surrounding, with surfaces, the front part and the upper part of the front-side portion of the suspension member 30, with the front cross member 34 and the tower bar 60, the rigidity of the front-side portion of the suspension member 30 is increased, and, by connecting the first rear cross member and the second rear cross member 33 having different directions of high rigidity to the left and right side beams 31L and 31R, the rigidity of the rear-side portion of the suspension member assembly 70 is increased. With this configuration, the rigidity of the entirety of the suspension member assembly 70 can be increased. Further, with this configuration, a deformation mode in which the suspension member assembly 70 as a whole deforms or a return deformation can be suppressed.

In addition, in the suspension member 30, the upper portions 41L and 41R of the left and right side beams 31L and 31R are formed in the groove shape which is open at the outer side in the vehicle width direction or at the vehicle upper side, and the first rear cross member 32 is formed in the groove shape which is open at the vehicle rear side. Moreover, the lower portions 51L and 51R of the left and right side beams 31L and 31R, and the second rear cross member 33 are formed in the groove shape which is open at the vehicle lower side. With this configuration, the suspension member 30 can be integrally molded by casting, by setting the die-cutting direction to the outer side in the vehicle width direction, the vehicle rear side, and the vehicle up-and-down direction.

In the above description, the tower bar 60 is described as having two fastening points with respect to each of the left and right side beams 31L and 31R; namely, the front fastening points 61L and 61R and the rear fastening points 62L and 62R, respectively, but the tower bar 60 is not limited to such a configuration. For example, a configuration may be employed in which three or more fastening points are provided on each of the left and right side beams 31L and 31R.

The invention claimed is:

1. A suspension member assembly attached to a rear part of a vehicle body, the suspension member assembly comprising:

a suspension member; and a tower bar attached to the suspension member, wherein the suspension member is integrally molded by casting, and comprises:

left and right side beams disposed on respective sides of a vehicle rear part and which extend in a vehicle front-and-rear direction;

a front cross member which connects between vehicle-front-side parts of the left and right side beams in a vehicle width direction; and a rear cross member which connects between vehicle-rear-side parts of the left and right side beams in the vehicle width direction, the front cross member has a length in the vehicle front-and-rear direction shorter than a length in a vehicle up-and-down direction, and the tower bar is provided at a vehicle rear side relative to the front cross member and at an upper side relative to the rear cross member, connects between the left and right side beams in the vehicle width direction, and has at least two fastening points with each of the left and right side beams.

2. The suspension member assembly according to claim 1, wherein each of the left and right side beams has, at a center in the vehicle front-and-rear direction, an upper arm connection part to which a suspension upper arm is connected, and the tower bar is provided at a vehicle front side relative to the upper arm connection parts.

3. The suspension member assembly according to claim 2, wherein each of the left and right side beams includes an upper portion and a lower portion, and the lower portion is curved in a shape which is convex downward, so that a space is formed between the lower portion and the upper portion.

4. The suspension member assembly according to claim 3, wherein the upper portion is formed in a groove shape which is open at an outer side in the vehicle width direction.

5. The suspension member assembly according to claim 3, wherein the lower portion is formed in a groove shape which is open at a vehicle lower side.

6. The suspension member assembly according to claim 1, wherein a center part of the front cross member in the vehicle width direction has a length in the vehicle front-and-rear direction shorter than a length in the vehicle up-and-down direction.

7. The suspension member assembly according to claim 6, wherein each of the left and right side beams includes an upper portion and a lower portion, and the lower portion is curved in a shape which is convex downward, so that a space is formed between the lower portion and the upper portion.

8. The suspension member assembly according to claim 7, wherein the upper portion is formed in a groove shape which is open at an outer side in the vehicle width direction.

9. The suspension member assembly according to claim 7, wherein the lower portion is formed in a groove shape which is open at a vehicle lower side.

10. The suspension member assembly according to claim 1, wherein the rear cross member comprises:

a first rear cross member; and a second rear cross member positioned at a vehicle front side relative to the first rear cross member.

11. The suspension member assembly according to claim 10, wherein the second rear cross member has a lower arm attachment part to which a suspension lower arm is attached.

12. The suspension member assembly according to claim 11, wherein the lower arm attachment part is a through hole formed on the second rear cross member, penetrating through in the vehicle front-and-rear direction.

13. The suspension member assembly according to claim 11, wherein the second rear cross member extends from respective lower surfaces of the left and right side beams, and has a U shape which is convex downward.

14. The suspension member assembly according to claim 10, wherein each of the left and right side beams includes an upper portion and a lower portion, and the lower portion is curved in a shape which is convex downward, so that a space is formed between the lower portion and the upper portion.

15. The suspension member assembly according to claim 14, wherein the upper portion is formed in a groove shape which is open at an outer side in the vehicle width direction.

16. The suspension member assembly according to claim 14, wherein the lower portion is formed in a groove shape which is open at a vehicle lower side.

17. The suspension member assembly according to claim 10, wherein the second rear cross member extends from respective lower surfaces of the left and right side beams, and has a U shape which is convex downward.

18. The suspension member assembly according to claim 1, wherein each of the left and right side beams includes an upper portion and a lower portion, and the lower portion is curved in a shape which is convex downward, so that a space is formed between the lower portion and the upper portion.

19. The suspension member assembly according to claim 18, wherein the upper portion is formed in a groove shape which is open at an outer side in the vehicle width direction.

20. The suspension member assembly according to claim 18, wherein the lower portion is formed in a groove shape which is open at a vehicle lower side.

* * * * *